Patented July 18, 1944

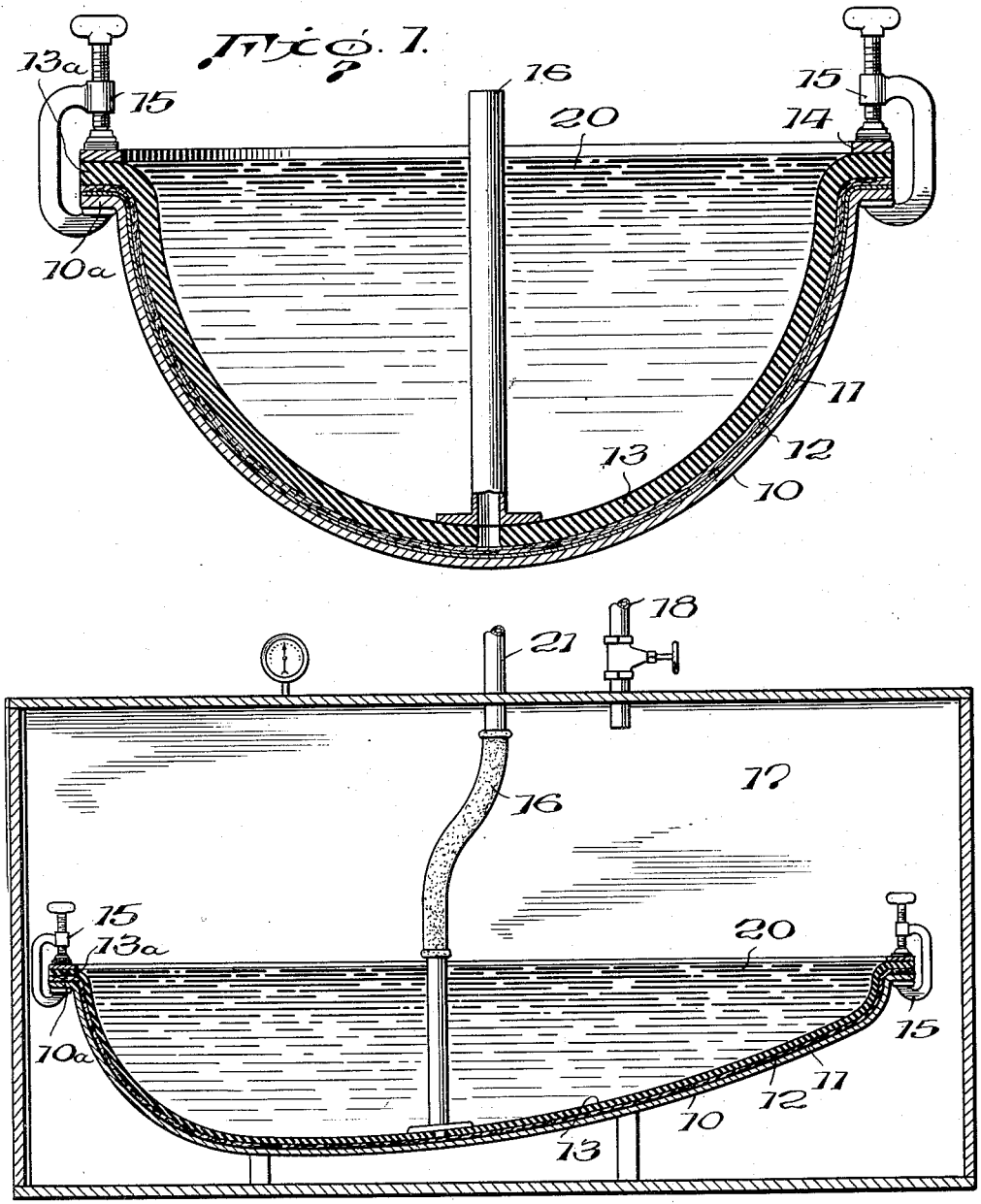

2,353,996

UNITED STATES PATENT OFFICE 2,353,996

METHOD OF MOLDING

Boris A. Cooke and Leonard W. Gane, Auburn, N. Y., assignors to Columbian Rope Company, Auburn, N. Y., a corporation of New York Application January 21, 1943, Serial No. 473,128

4 Claims. (Cl. 18—56)

This invention relates to improvements in molding processes and particularly to that type of molding wherein a rubber member is used for confining the moldable mass against the surface of a rigid mold member.

For instance, in the molding of compositions of a synthetic resinous binder and filler material preferably in the form of comparatively long vegetable fibers, it has been proposed to confine the moldable mass against the molding surface of a rigid mold with a rubber retaining member, either in the form of a blanket secured around the edge of the mold or in the form of a rubber bag enclosing the mold and sealed so that air can be evacuated from between the rubber member and mold preliminary to the actual molding operation which is carried out in an autoclave or pressure chamber in which the described assembly of the mold, confining member, and material can be subjected to the desired temperature and pressure for molding and setting the material. However, the use of the rubber confining member has heretofore more or less constituted a limitation on the temperatures and pressures that could be used in the actual molding operation, especially when steam was used as the heating and pressure medium. The nature of the molding material, especially when it embodied a filler of vegetable origin, was also, in some instances, a limitation on the molding temperatures that could be used. The rubber blanket or bag was a limiting factor because, with higher temperatures, the useful life thereof was very short and the filler of vegetable origin was subject to charring or burning if comparatively high temperatures were used.

With these factors in mind, one object of the present invention is to provide a method of molding, wherein the life of the rubber member for confining the moldable material in the mold will be materially increased.

Another object is to provide a method of molding wherein higher steam pressures can be used and the life of the rubber confining member still prolonged. compared with the normal life of said member in prior similar molding practices.

A still further object is to provide a molding method wherein higher temperatures can be used without danger of charring or otherwise detrimentally affecting filler materials of vegetable origin, so far as concerns their property of imparting strength to the molded article.

More specifically, the invention contemplates a method of molding wherein the rubber confining member is protected by means which will prevent overheating thereof without interfering with the application of the molding pressures to the surface of the material against which said member is juxtaposed.

With these and other objects in view, the invention consists in certain details of construction and arrangements and combinations of parts, all as will hereinafter be more fully described and the novel features thereof particularly pointed out in the appended claims.

In the accompanying drawing, wherein apparatus used in the molding method contemplated by the present invention is illustrated—

Figure 1 is a cross-sectional view taken transversely of a mold showing the loading thereof for forming a one-half section of a so-called jettison fuel tank for aircraft; and Fig. 2 is a sectional view, taken longitudinally of an autoclave or pressure chamber with the loaded mold therein.

As indicated, the mold used for purposes of illustrating the present invention is of the shape used in molding jettison tank half-sections which, when assembled, form a tank of so-called tear-drop contour, but it will be understood that the mold may be of any desired shape, depending upon the shape of the article to be produced. The mold may also be constructed of different materials. Preferably, it is formed of a comparatively thin cast iron shell 10, provided on its molding surface with a ceramic or enamel facing or coating 11, in order to impart a good finish to the surface of molded article. If very high steam pressure, say, in the neighborhood of 100 pounds to 150 pounds, are used, a material of lower heat conductivity, for instance, can be used for the mold instead of metal to prevent flash or instantaneous setting of binder material at the surface of the molded article adjacent the face of the mold.

The body of material to be molded is indicated at 12. Where the ultimate object is to be of irregular shape, as in the case of jettison tank half-sections, this body of material is preferably pre-shaped so that it will substantially fit the mold 10. After this pre-shaped form is placed in the mold, the exposed surface thereof is covered with a rubber member 13 which, in effect, serves as a second mold member. This rubber member must cover, at least, the entire body of material 12. In the present instance, a rubber blanket is used and it, also, is preferably shaped to substantially fit the exposed surface of material 12. If the material being molded is a composition of synthetic resinous binder and a vegetable fiber filler (the type of material now being used in jettison tanks), it is desirable to substantially evacuate the air from between the rubber covering 13 and the mold. Where a rubber blanket is used, as in the present illustration, it is secured firmly against the mold around the edge, as by a clamping ring 14 and clamps 15 which are positioned around the flanges 10ª, 13ª of the mold and blanket. Thus, these edges are hermetically sealed and air can be withdrawn from between the blanket and mold through a pipe connection by means of a vacuum pump (not shown). This assembly of the loaded mold is then ready to be placed in the pressure chamber, trucks or other conveyors usually being used for transporting the loaded molds into and out of said chamber.

Steam under pressure is preferably used as the heating and pressing medium, particularly when the moldable material comprises a thermosetting resinous binder, and an autoclave or pressure chamber 17 and suitable steam connections 18 are shown more or less diagrammatically in Fig. 2 for the application of heat and pressure to the loaded molds. Formerly, the mold loaded as described has been placed in the autoclave, but the pressures used were limited because the rubber confining member deteriorated so quickly under the influence of the steam and heat. To overcome this difficulty, the present method provides protection for the rubber member by means which will also permit the use of higher pressures, so that greater density can be obtained in the molded product without danger of charring or damaging the filler material in the molding composition. This is accomplished by covering the rubber confining member 13 with a liquid, preferably water, before the autoclave is closed and steam admitted thereto. Preferably, the water or other liquid is heated to approximately 200° F. before it is supplied to the mold to prevent chilling the mold, and thus prolongs the time required in bringing the mold to the temperature used in setting the composition. Any means may be utilized for depositing the water on or in the mold. The rigid mold member 10 for molding jettison tank half-sections is of concave formation, as is also the rubber blanket 13, thus providing a depression in which the water 20 is retained so as to cover substantially the entire surface of the blanket which would otherwise be exposed to the steam and consequent heat within the autoclave. However, it is apparent that other means may be provided for retaining the water on or over the blanket surface to be protected, in the event the mold and blanket are not of concave formation.

It should also be pointed out that, in some instances in the past, the mold, charged with the molding composition, has been placed in a rubber bag which fully envelopes the mold and which serves the same purpose as the rubber blanket 13 illustrated in the present instance. The air is exhausted from said bag so that it collapses into close contact with the mold proper and, of course, it is possible to protect at least portions of these bags by the use of water, as described herein.

It will be realized that, as the pressure of the steam in the autoclave increases, there will be a corresponding rise in the temperature, and it is this fact that has limited the steam pressures used in molding, where the material has been confined in the mold by a rubber member. However, by covering the surface of the rubber with water or other suitable liquid, higher pressures and temperatures can be used without detrimentally affecting the rubber member, because of the heat retarding action of the water.

As previously pointed out, the provision of the protective body of water accomplishes other results or advantages in addition to merely permitting the use of higher pressures and higher temperatures, without damaging the rubber member. For instance, when molding a composition of a synthetic thermo-setting resinous binder and a vegetable fiber filler, higher temperatures which would char the fibers in the absence of the protective body of water can be used. For instance, in molding a composition having a fiber filler, the presence of the water will permit the use of steam pressures from 100 pounds and higher; whereas, in the absence of the water, the temperatures developed by these higher pressures would seriously affect the quality of the fibrous matter. Also, as will be appreciated, molding of such compositions under these higher pressures results in superior mechanical characteristics in the molded articles by reason of the greater density obtained therein through the use of increased pressure.

In actual practice, the hose connection 16 of the mold assembly is hooked up to a vacuum pump (not shown), after the charged mold is placed in the autoclave. A connection to the autoclave for this purpose is indicated at 21. In this way, all air or gases can be withdrawn from the mold while the material is undergoing the heat treatment, so as to eliminate air pockets or voids in the molded product.

While the period of time required for this actual molding or setting operation may vary for different materials or for the different pressures used or because of the nature of the article being produced, nevertheless, the time involved in each instance is always so prolonged that the rubber member 13 would be detrimentally affected in the absence of the protective body of water.

Of course, other liquids of relatively low heat conductivity might be used in lieu of water and the use of such liquid protective means is not necessarily limited to the particular molding composition which has been described herein in illustrating the present invention. Also, while the confining blanket or bag has been described as being made of rubber, such term is to be construed broadly to include synthetic rubber materials.

What we claim is:

1. In the method of molding a composition of a thermosetting binder and vegetable fiber filler wherein said composition is confined between a rigid mold member and a rubber member and said mold assembly is directly exposed to heat and fluid pressure in a pressure chamber, the step of maintaining at least a portion of the surface of said rubber member submerged in a liquid of relatively low heat conductivity while said mold assembly is exposed to said heat and fluid pressure in said chamber.

2. In the method of molding a thermosetting mass wherein the mass is confined between a rigid mold member and a rubber member and heat and fluid pressure is directly applied to said mold assembly in a pressure chamber, the step of insulating at least a portion of the otherwise exposed surface of said rubber member with water against said heat while in said pressure chamber.

3. In the method of molding a plastic mass containing a synthetic resinous binder and a filler material wherein said mass is set in its molded shape while confined between a rigid mold member and a rubber covering member by the direct application of heat and fluid pressure to said mold assembly in a pressure chamber, the step of maintaining at least that portion of said rubber member in contact with said mass covered with a liquid of relatively low heat conductivity during the application of heat and fluid pressure to said mold assembly in said pressure chamber.

4. In the method of molding a plastic mass containing a synthetic resinous binder and a vegetable fiber filler, wherein said mass is set in its molded shape while confined between a rigid mold surface on one side and a covering of rubber on its opposite side by the direct application of heat and fluid pressure to said mold assembly in a pressure chamber, the steps of providing means for retaining a body of liquid on an otherwise exposed surface of said rubber covering and maintaining a liquid of relatively low heat conductivity in said retaining means during the application of heat and fluid pressure to the mold assembly in said pressure chamber.

BORIS A. COOKE.
LEONARD W. GANE.